Jan. 29, 1957   I. D. PRESS   2,779,564
CAM ACTUATED VALVE
Filed Sept. 26, 1952   2 Sheets-Sheet 1

INVENTOR.
Irving D. Press
BY
Williams, Rich & Morse
Attorneys

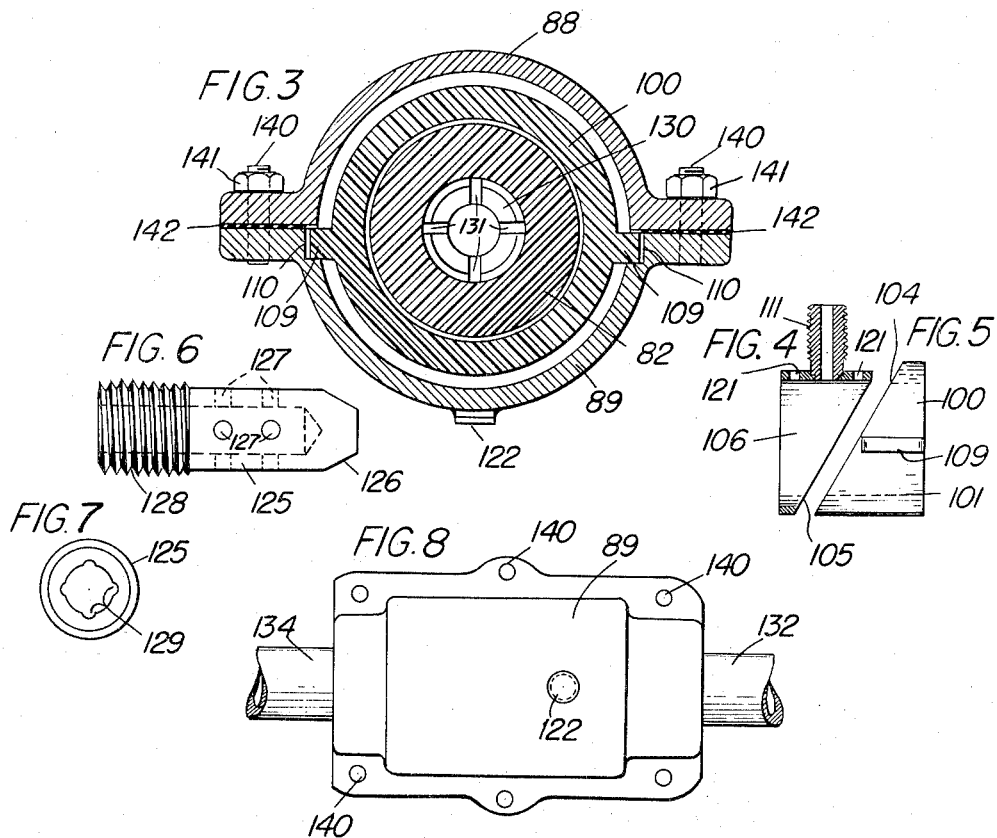

United States Patent Office 2,779,564
Patented Jan. 29, 1957

2,779,564

CAM ACTUATED VALVE

Irving D. Press, Union, N. J., assignor to Resistoflex Corporation, Belleville, N. J., a corporation of New York Application September 26, 1952, Serial No. 311,683

6 Claims. (Cl. 251—257)

This invention relates to valves, more particularly to valves for use in handling corrosive chemicals.

There is a need in the chemical industry for a corrosion-proof valve in the handling of fluids, either liquid or gaseous, which attack the metals of which valves are usually made. Heretofore resort has been had to glass stop cocks, metal valves lined with inert materials, etc. These do not have the desired ruggedness or versatility. There are already available conduits such as rigid or semi-rigid pipe, flexible tubes and the like of various inert synthetic resins and the present invention provides a valve which may be coupled thereto so that the flow through such conduits may be suitably controlled.

The principal object of the invention is to provide a valve having a body which is completely enclosed, except for the openings to which the conduit is connected, which body is made of chemically inert material.

Another object is to provide such a valve in which the actuating mechanism is wholly external to the valve body so that no gaskets or packing are required to prevent leakage of the fluid being controlled and which might be subject to attack thereby.

A further object is to provide a valve having one or more bellows portions, subject to internal pressure by the fluid being conveyed, in which the bellows are externally supported by an incompressible fluid so that the valve can be used in lines carrying fluid under high pressure.

Still another object is to provide novel valve actuating mechanism in which the valve is controlled by a wedging action.

Other objects and advantages will in part appear and in part will be obvious from the ensuing detailed description of illustrative embodiments of the invention.

In accordance with the invention a unitary valve body is formed from a single piece of inert, semi-rigid synthetic resin in which body there is a bore provided with a seat, means being provided for connecting the conduit with the bore. A portion of the body is in the form of a flexible bellows so that there may be relative movement between parts of the body on opposite sides of the bellows. A valve plunger, also of inert material, is attached to the body so that it moves relative to the seat. Suitable mechanical means are provided which are wholly external to the valve body for moving the plunger.

As synthetic resins from which the valve body and plunger may be made I prefer to use polytetrafluoroethylene or polychlorotrifluoroethylene, which materials are available under the trade names of "Teflon" and "Kel-F." These materials are highly inert, are of sufficient rigidity to be machined, sufficiently flexible in thin sections to provide adequate bellows movement, are very tough and highly resistant to fatigue. They may be shaped by molding or by extrusion. Since it has been found that extruded shapes have better tensile strength than molded shapes the former are preferred in making the valve body. While these materials have been found most suitable, it is to be understood that other materials may be used which meet the physical and chemical requirements of the service for which they are intended.

An embodiment of the invention is hereinafter described, in order that those skilled in the art will understand how the invention may be practiced, and is illustrated in the drawings, in which:

Fig. 3 is a section through the valve taken on the line 3—3 of Fig. 1;

Fig. 4 is a central sectional elevation of the throttling gate;

Fig. 5 is a side elevation of the control gate;

Fig. 6 is a plan of the valve plunger;

Fig. 7 is an end view of the plunger as seen from the left of Fig. 6;

Fig. 8 is a bottom plan view of the valve casing; and

Fig. 9 is an end view of the valve as seen from the right of Fig. 1.

The valve as illustrated in Figs. 1–9 is opened by a spring and closed by mechanical force applied so as to contract the spring and move the valve plunger against its seat. In considering the ensuing description it should be borne in mind, however, that by a simple reversal of parts the valve may be so constructed that it may be closed by the spring and opened by force applied to compress the spring and move the plunger away from its seat.

A novel characteristic of the valve is that the valve body which comprises bellows portions subject to internal fluid pressure, is enclosed in a rigid housing which is filled with incompressible liquid surrounding the bellows for the purpose of transmitting the internal pressure to the housing, thus preventing radial expansion of the bellows or bulging of the bellows walls.

Figure 1:
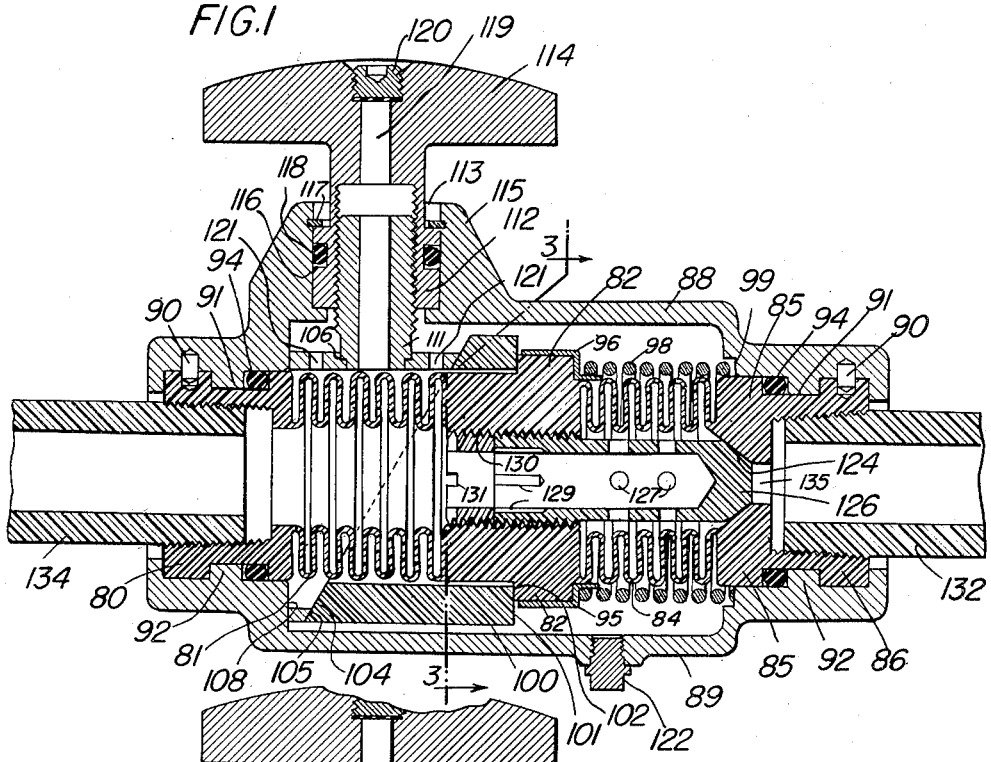
Fig. 1 shows an embodiment of the invention in the form of a straight-through valve in central sectional elevation, showing the valve in closed position.
Figure 2:
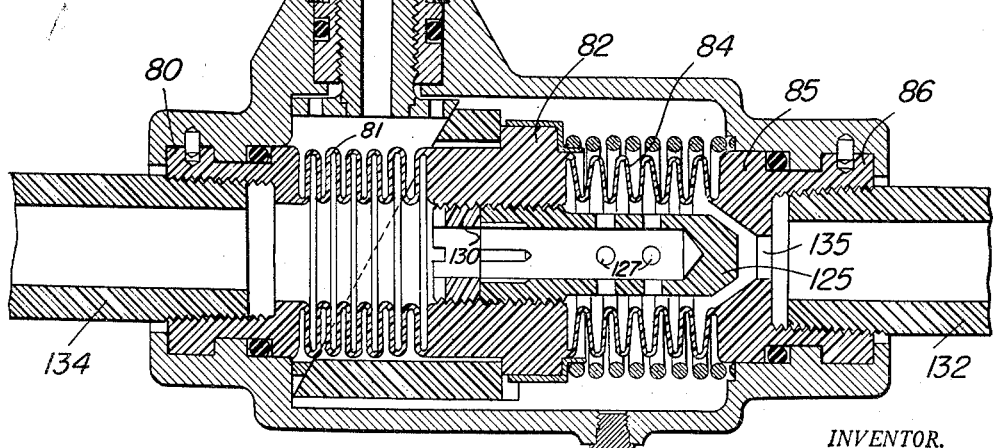
Fig. 2 is a similar view showing the same valve in open position.

Fig. 1 shows the valve closed and Fig. 2 shows it open, the valve illustrated being of the straight through or in-line type. This valve has a unitary valve body which may be produced by machining a molded preform or extruded rod or tube, preferably the latter, of inert semi-rigid plastic material, as described above, so as to produce (naming the parts from left to right) a connecting portion 80, a first bellows 81, a head portion 82, a second bellows 84, a seat portion 85 and a second connecting portion 86. This valve body is enclosed in and anchored at its ends to a longitudinally split two-piece flanged metal housing consisting of upper member 88 and lower member 89. The connecting portions 80 and 86 are locked in annular grooves in the two housing members, as shown, and to prevent rotation of the valve body therein, when pipes are connected, the upper housing member 88 is provided with pins 90 which enter holes in the connecting portions 80 and 86. Inwardly of these connecting portions the valve body is provided at each end with a wide annular groove 91, the inner faces of these grooves being spaced from the inwardly extending annular ribs 92 of the housing, the spaces between these members being occupied by O-rings 94 which provide hydraulic seals for the liquid filling the casing.

The valve body being locked within the rigid casing at its ends 80 and 86, the head portion 82 which is connected thereto by means of the two bellows 81 and 84 is free to move longitudinally by contraction of one bellows and extension of the other. Bearing against the shoulder 95 of head portion 82 is a shouldered spring retaining ring 96 which is inserted inside one end of the compression coil spring 98, the other end of which may be seated in a groove 99 in the casing. This spring tends to move head portion 82 to the left as seen in the drawings. For moving it to the right, the valve body is surrounded by a cylindrical control gate member 100 (Fig. 5) which has a flat face 101, which abuts the shoulder 102 of head portion 82, and a beveled face 104 which bears against the correspondingly beveled face 105 of a cylindrical actuating member 106 (Fig. 4), the opposite flat face of which abuts the wall 108 of the housing. To prevent rotation of the control gate 100, it is provided at either side with a rib 109 which ribs slide in grooves 110 in the lower housing member 89 as may be seen in Fig. 3.

In the structure just described spring 98 opens the valve. By placing it on the opposite side of head portion 82 it can be made to close the valve, which has the advantage of maintaining the valve closed by spring pressure which would compensate for cold flow in the valve parts. Parts 100 and 106 would then be on the right of head 82.

Attached to or integral with the top of actuating member 106 is an externally threaded hollow stud 111 which screws into the internally threaded socket portion 112 of the actuating handle 114 which is rotatably mounted in a bore 113 in the boss 115 of upper housing member 88. Socket portion 112 is provided with a groove 116 containing an O-ring 118 to provide a fluid tight seal and is secured in place in boss 115 by means of a retaining ring 117 which is snapped into a groove in the boss and bears against the upper face of socket portion 112. Handle 114 is provided with a bore 119 and a removable filling plug 120 through which liquid may be introduced into the casing. To allow such fluid to flow inside of the actuating member 106 the latter is provided with the openings 121. For the removal of liquid, lower casing member 89 is provided with a drain plug 122.

It will thus be seen that as handle 114 is rotated, it acts through stud 111 to reciprocate actuating member 106 which, by a wedging action, moves head portion 82 of the valve body in cooperation with spring 98.

Seat portion 85 of the valve body is provided with a conical seat 124 for a valve plunger 125 which will be made of an inert material like the valve body. This plunger (Fig. 6) has a conical end 126, contains openings 127 communicating with its hollow interior, and has a threaded head 128 which screws into the internally threaded head portion 82 of the valve body. As shown in Figs. 1 and 7, plunger 125 has a plurality of longitudinally extending internal grooves 129 to be engaged by a tool which may be used to screw it into the valve body. To retain the plunger in place, a locking ring 130 having cross slots 131, also of inert material, is screwed tight against the plunger.

The connecting portions 80 and 86 of the valve body are internally threaded for connection with pipes 132 and 134. Thus, when the valve is opened as shown in Fig. 2, fluid may flow from pipe 132 through the opening 135 in seat portion 85, around the outside of plunger 125, through the openings 127 therein to its interior, through the hollow locking ring 130 and bellows portion 81 to the pipe 134, or vice versa. The space between the valve body and the housing members 88 and 89 is completely filled with incompressible liquid and any pressure developed inside the body will be transferred thereby to the rigid housing, thus preventing any bulging of the bellows portions 81 and 84.

Referring to Figs. 3, 8 and 9, lower housing member 89 is provided with studs 140, by means of which the upper housing member 88 is secured thereto by nuts 141, gaskets 142 being interposed to make a fluid tight joint.

It will be seen that the above described structure provides a valve in which the fluid being handled comes in contact only with the inert material of the valve body, valve plunger and locking ring and that the valve body is completely sealed, being of unitary construction from one end to the other. The only gaskets in the valve are used merely for the retention of the pressure transmitting liquid which will be of such a nature as not to deteriorate them.

While the invention has been explained by reference to illustrative embodiments thereof which have been described in detail, it is to be understood that many modifications may be made therein within the scope of the invention as defined in the appended claims.

What is claimed is:

1. In a valve of the type having a housing within which is a valve body serving as a fluid conduit and comprising a movable head portion connected to two end portions by flexible bellows, said end portions being secured to said housing, and valve means within said body comprising a valve seat and a valve plunger movable relative to each other upon movement of said head portion; means for moving said head portion to actuate said valve means comprising a control gate member and an actuating member having complementary inclined faces, said members being tubular and interposed between a wall of said housing and said head portion and surrounding a portion of said body, means for sliding said actuating member relative to said control gate, and a spring urging said members together.

2. The valve of claim 1 wherein said spring is interposed between a wall of said housing and said head member and urges said head member against said control gate member.

3. The valve of claim 1 wherein said means for sliding said actuating member comprises a threaded stud nonrotatably attached to the actuating member, a rotatable handle having a threaded connection with said stud, and means for rotatably supporting said handle in said housing.

4. The valve of claim 1 wherein said means for sliding the actuating member comprises a handle rotatably supported in said housing, and a threaded connection between said handle and said actuating member.

5. The valve of claim 1 wherein said spring is a compression coil spring surrounding a portion of said body and said valve parts are so arranged as to be opened by said spring.

6. The valve of claim 1 wherein said control gate member is slidably keyed to said housing to prevent rotation while permitting movement axially of said body.

References Cited in the file of this patent

UNITED STATES PATENTS

| 1,678,927 | Weatherhead | July 31, 1928 |
| 1,755,536 | Chase | Apr. 22, 1930 |
| 1,928,071 | Mueller | Sept. 26, 1933 |
| 1,956,027 | Heitman | Apr. 24, 1934 |
| 1,983,106 | Sundstrom | Dec. 4, 1934 |
| 2,016,839 | Schoenberger | Oct. 8, 1935 |
| 2,194,263 | Allen | Mar. 19, 1940 |
| 2,245,946 | Vermere | June 17, 1941 |
| 2,416,570 | Coleman | Feb. 25, 1947 |
| 2,417,242 | Eckel | Mar. 11, 1947 |
| 2,482,780 | Kirby | Sept. 27, 1949 |
| 2,559,116 | Doschek | July 3, 1951 |
| 2,583,178 | Huntington | Jan. 22, 1952 |
| 2,661,019 | Snyder | Dec. 1, 1953 |
| 2,675,204 | Johnson | Apr. 13, 1954 |
| 2,704,547 | Fox | Mar. 22, 1955 |

FOREIGN PATENTS

| 596,938 | France | Aug. 21, 1925 |
| 752,652 | France | July 24, 1933 |
| 1,012,047 | France | of 1952 |